US008002049B2

(12) United States Patent
Keese et al.

(10) Patent No.: US 8,002,049 B2
(45) Date of Patent: *Aug. 23, 2011

(54) WELL TREATING METHOD TO PREVENT OR CURE LOST-CIRCULATION

(75) Inventors: Roger Keese, Houston, TX (US); Trevor Munk, Calgary (CA); Raafat Abbas, Abu Dhabi (AE); Erik Nelson, Houston, TX (US); Benoit Vidick, Tripoli (LY)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/949,355

(22) Filed: Dec. 3, 2007

(65) Prior Publication Data

US 2008/0110627 A1 May 15, 2008

Related U.S. Application Data

(63) Continuation of application No. 10/556,696, filed as application No. PCT/EP2004/005032 on May 10, 2004, now Pat. No. 7,331,391.

(60) Provisional application No. 60/470,170, filed on May 13, 2003.

(51) Int. Cl.
*E21B 7/00* (2006.01)
*C09K 8/02* (2006.01)

(52) U.S. Cl. ......... 175/64; 175/65; 166/305.1; 166/278; 166/300

(58) Field of Classification Search ........................ None
See application file for complete search history.

(56) References Cited

U.S. PATENT DOCUMENTS

| | | | | |
|---|---|---|---|---|
| 2,610,149 | A * | 9/1952 | Van Dyke | 507/104 |
| 2,894,906 | A * | 7/1959 | Sheeler | 507/104 |
| 3,199,591 | A * | 8/1965 | Kepley | 166/279 |
| 3,774,683 | A * | 11/1973 | Smith et al. | 166/293 |
| 5,501,275 | A * | 3/1996 | Card et al. | 166/280.2 |
| 5,782,300 | A * | 7/1998 | James et al. | 166/278 |
| 6,152,227 | A * | 11/2000 | Lawson et al. | 166/293 |
| 6,419,019 | B1 * | 7/2002 | Palmer et al. | 166/311 |
| 6,605,570 | B2 * | 8/2003 | Miller et al. | 507/211 |
| 6,702,044 | B2 * | 3/2004 | Reddy et al. | 175/64 |
| 7,331,391 | B2 * | 2/2008 | Keese et al. | 166/292 |
| 7,431,106 | B2 * | 10/2008 | Alberty et al. | 175/72 |
| 2003/0062160 | A1 * | 4/2003 | Boney et al. | 166/278 |
| 2005/0284666 | A1 * | 12/2005 | Cowan | 175/65 |

FOREIGN PATENT DOCUMENTS

EP 1284248 A1 * 2/2003

OTHER PUBLICATIONS

"Colloid," retrieved from http://en.wikipedia.org/wiki/Colloid, Jul. 21, 2009.*

* cited by examiner

*Primary Examiner* — Zakiya Bates
*Assistant Examiner* — Angela M DiTrani
(74) *Attorney, Agent, or Firm* — David Cate; Robin Nava; Jeffrey Griffin

(57) ABSTRACT

A method of preventing or treating lost circulation during the drilling of a well comprises the addition, at concentration ranging between about 0.5 and 6 pounds per barrel, of water-dispersible fibers having a length between about 10 and 25 mm, for instance glass or polymer fibers, to a pumped aqueous base-fluid including solid particles having an equivalent diameter of less than 300 μm.

The base-fluid with the solid particles can be the drilling fluid or a small-volume pill specially pumped for curing lost circulation.

5 Claims, 1 Drawing Sheet

WELL TREATING METHOD TO PREVENT OR CURE LOST-CIRCULATION

This application is a Continuation Application of U.S. patent application Ser. No. 10/556,696, filed Sep. 20, 2006, now U.S. Pat. No. 7,331,391, based on PCT/EP2004/005032, filed May 10, 2004, and claims the benefit of the disclosure of U.S. Provisional Patent Application Ser. No. 60/470,170, filed May 13, 2003.

FIELD OF THE INVENTION

The present invention relates to the methods of preventing or curing lost circulation problems encountered during the drilling of wells such as oil, gas or geothermal wells, or the like.

BACKGROUND OF THE INVENTION

Lost circulation is defined as the total or partial loss of drilling fluids or cement into highly permeable zones, cavernous formations, and natural or induced fractures during drilling or cementing operations. The consequences of lost circulation can include:

- Blowout, due to drop in fluid level in the well (loss of hydrostatic head);
- Stuck pipe due to poor cutting removal;
- Zonal isolation failure due to insufficient cement filling;
- Increased cost due to loss of drilling fluids or cement, increased rig time and remedial cementing operations;
- Formation damage due to losses to the producing zone; and
- Loss of the well.
- The severity of lost circulation can vary from minor (<10 bbl (1.5 $m^3$)/hr) to severe (total loss of fluids, unable to keep hole full or obtain returns to surface).

One approach to dealing with lost circulation is to add materials ("lost circulation materials" or "LCMs") to the fluid which bridge or block seepage into the formation. LCMs generally fall into four main types:

- Granular (e.g. ground nut shells, plastics, or limestone);
- Lamellar (e.g. cellophane flakes);
- Fibrous (e.g. sawdust, hay, glass fibers); and
- Encapsulated fluid-absorbing particles.

LCMs can vary in size from 200 mesh to ¾ inch and are typically used at concentrations of from 8-120 lb/bbl according to the severity of losses.

Cement plugs, often including LCMs, set at the level of lost circulation have also been used to address these problems during drilling. Low density cements, including foamed cements have been considered as particularly useful. It has generally been considered that the use of LCMSs in cement slurries in only effective for minor or partial losses, and the for total loss situations, foamed cement is the only effective solution. The most common LCMs used in cement slurries have been granular materials such as Gilsonite, crushed coal, or ground nut shells. Cellophane flake material has been attempted but problems are encountered with mixing of the slurry at higher loadings. Fibrous materials are seldom used in cement slurries because of problems in plugging the cementing equipment. One system using fibers that has been proposed is described in EP 1284248 and comprises the use of glass or polymer fibers in a low density cement slurry having solid materials present in discrete particle size bands.

Other gelling or viscous systems that do not contain Portland cement have also been used as plugs. Examples of these are gelling agents such as silicates with a suitable activator. Such plugs may also contain bridging materials such as ground calcium carbonate with particle sizes in the range 8 μm to 254 μm and at concentrations of up to 10 lb (4.5 kg)/bbl. Other gelling systems include Sorel cement (magnesium oxide, magnesium chloride and water).

Certain downhole-mixed system have also been proposed. These include mud-diesel-oil-bentonite (M-DOB) plugs and polysaccharide gelling systems encapsulated in emulsions that are broken by shear forces downhole (see EP 0738310). A development of this later system has the gelling system combined with cement (see WO 00/75481)

Further details of lost circulation problems and possible solutions can be found in Baret, Daccord and Yearwood, Well Cementing, Chapter 6 "Cement/Formation Interactions", 6-1 to 6-17.

It is an object of the present invention to provide techniques that can be used during drilling to reduce problems associated with lost circulation.

SUMMARY OF THE INVENTION

In its broadest sense, the present invention comprises treating a well with an aqueous base-fluid including solid particles having an equivalent diameter of less than 300 μm and water-dispersible fibers having a length between about 10 and about 25 mm, added at a concentration between about 0.5 and 6 pounds per barrel of fluid.

Without wishing to be bound by a theory, it appears that the water-dispersible fibers enhance the formation of a filter cake by forming a mesh along the borewall that easily plugs with the small solid particles.

The fluid of the invention can be the drilling fluid itself, and this later case, the small solid particles are constituted for instance by the weighting materials added to increase the weight of the drilling fluid, that include for instance barite (barium sulfate), hematite (iron oxide), ilmenite (iron titanium oxide), siderite (iron carbonate), galena (lead sulfide), manganese tetraoxide or zinc oxide. The weighting particles have an average particle size in the range of 20 to 200 μm—that is an order of magnitude of about 100 to 1000 times smaller than the water-dispersible fibers. Typically amounts of weighting material used are in the range 0.2 to 2, more usually 0.25 to 1.5 kg per liter.

According to one embodiment of the invention, the water-dispersible fibers are glass fibers typically 10-15 mm long, 20 microns in diameter. They are preferably made of alkali-resistant fibers chopped strands having a water-dispersible sizing system as products readily available as asbestos-replacement fibers. The higher the fiber length the better its ability to form a web-like structure. However, glass-fibers above 15 mm have so for proven to be impossible to pump with standard mixing equipment available on a rig site. Concentrations range usually from about 1 to about 3 pounds per barrel of fluid though higher concentration may be required for particularly critical case (in this case, the fluid is more likely to be pumped as a pill of relatively short volume).

The fibers are typically added in the surface mixing equipment used to mix the drilling fluid. Typical concentrations for the fibers are 1-5 lb/bbl. Other LCMs such as other fibrous materials, flakes and granular sized particles can also be added at similar concentrations.

According to another embodiment of the present invention, the fibers are polymer-fibers such as novoloid fibers, available for instance in length ranging from about 18 to 22 mm and in diameter of about 21 mm, with a water content of 35-45% (see U.S. Pat. No. 5,782,300 for more detailed description of suitable fibers).

As mentioned above, the treating fluid of the present invention can be the fluid currently used to drill the well, or specially-mixed fluids for the purpose of curing lost circulation problems, possibly in the form of a pill of limited volume. In this later case, the fluid will still contain small-sized solids—typically similar to the one commonly encountered in drilling fluids. In one embodiment said pill may be a spacer.

One particularly preferred form of pill includes fibers and a cement such as micro-cement, optionally with the addition of a bridging material such as calcium carbonate or sized granular particles. Such a pill can include 80% sized calcium carbonate and 20% micro-cement as well as the fibers. Polymers can also be included.

While such pills can be pumped continuously, it may also be desirable to mix and pump a volume that does not return to the surface but only is sufficient only to reach the lost circulation zone so as to avoid plugging surface equipment.

Another aspect of the invention involves the use of the fibers in cement slurries. In this aspect a low-density cement slurry having solid components present in discrete particle size bands, and containing the fibers is prepared and pumped into the well along with pressurized gas so as to form a very low density foamed slurry which is placed adjacent the lost circulation zone.

BRIEF DESCRIPTION OF THE DRAWINGS

The present invention will now be described by way of examples and with reference to the accompanying FIG. 1, which shows a schematic view of a system for supplying foamed, low-density cements with fibers for lost circulation problems.

DETAILED DESCRIPTION

Figure 1:
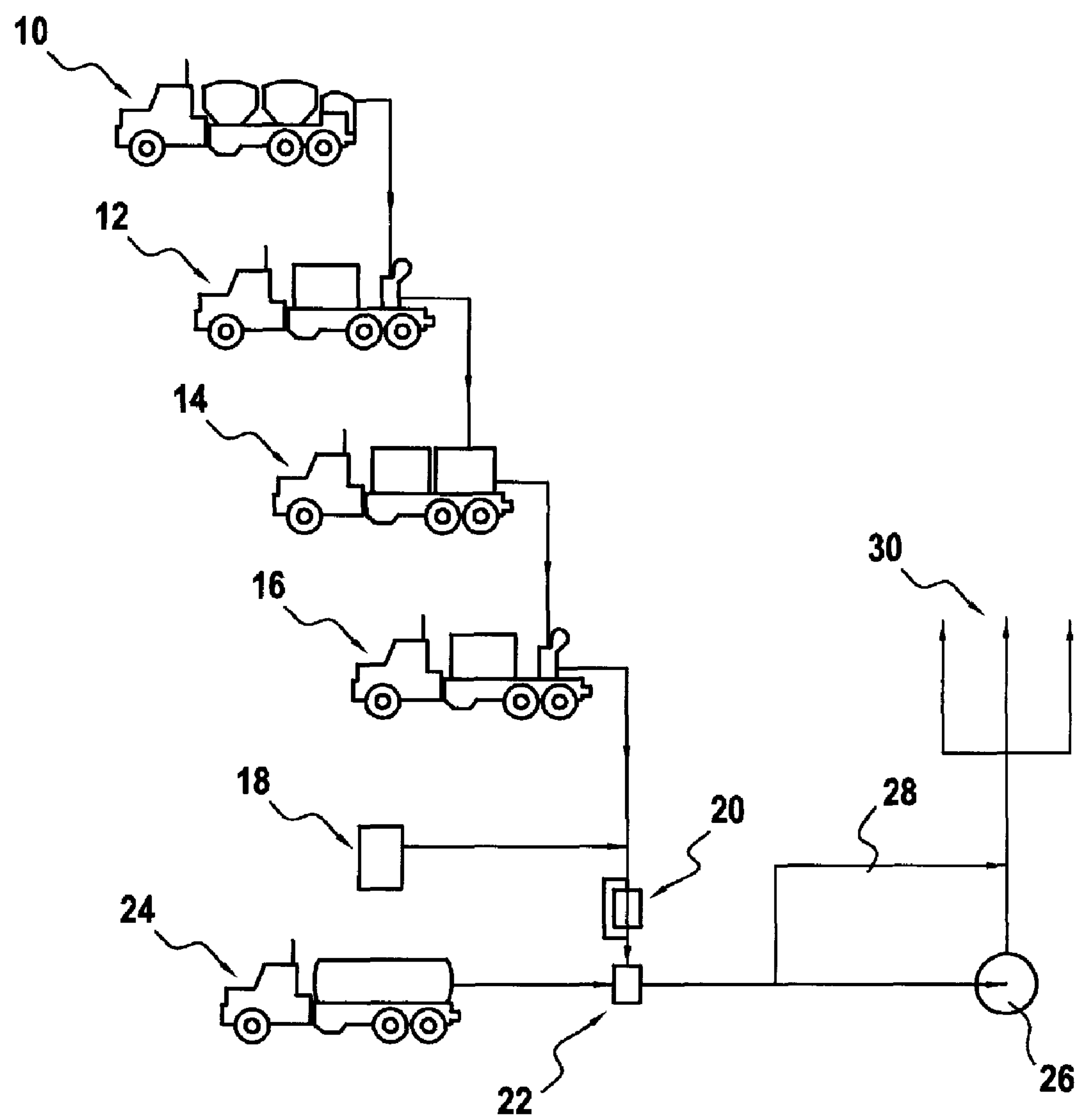

The present invention is applicable to various types of drilling fluids, both water based and oil-based as shown in the tables below:

| | Commercial Names |
|---|---|
| Water-Based Muds | |
| □□Bentonite muds | M-I Gel |
| □□Polymer muds | PolyPlus |
| Inhibitive muds | |
| □□Encapsulating muds | MCAT |
| □□Glycol mud | Glydrill |
| □□Reservoir drilling muds | Stardrill |
| | DiPro |
| Old Systems | |
| □□Gypsum mud | |
| □□Lime mud | |
| Exotic water-based muds | |
| □□Silicate muds | SigmaDrill |
| □□Conductive muds | Sildrill |
| □□MMH | |
| □□Aphrons, FazePro | |
| □□Formate muds | |
| Oil-Based Muds | |
| □□Diesel-based muds | Versadrill |
| □□Mineral oil-based muds | Versaclean |
| □□Low-toxicity mineral oil (LTMO) | Versavert |
| Synthetic oil-based muds | |
| □□Linear alpha-olefins | Novaplus |

-continued

| | Commercial Names |
|---|---|
| □□Internal olefins | Novatec |
| □□Ester muds | Petrofree |
| | Finagreen |
| □□Exotic systems: Acetal, ether, etc. | Ecogreen |

The following two examples illustrate the use of fiber materials to solve lost circulation problems in accordance with the invention.

EXAMPLE 1

A well drilled to a vertical depth of 2700 m encountered a severe lost circulation zone. The well was being drilled with GelChem drilling mud having the following properties:

| | |
|---|---|
| Viscosity: | 77 |
| PV/YP: | 19/15 |
| Gel Strength: | 6/16 |
| Water Loss: | 8.2 |
| pH: | 10 |
| Cl: | 900 |
| Ca: | 35 |
| Density: | 1100 kg/m$^3$ |
| Plastic Viscosity: | 55-65 cp |

At the start of the procedure according to the invention, 13 bags (~295.1 kg) of water-dispersible 10-14 mm long, 20-micron diameter glass fibers were added to the basic mud and pumped into the well. This was followed by a further 8 bags (~181.6 kg) pumped in the mud, after which returns were observed at the surface. Finally, a further 11 bags of fibers (~249.7 kg) were added and pumped into the well after which full circulation was observed at the surface (i.e. the amount of mud returning to the surface equaled the amount pumped into the well). In total, 727 kg of fibers were pumped in 110 m$^3$ of drilling mud (GelChem).

EXAMPLE 2

A well drilled to a vertical depth of 630 m encountered a severe lost circulation zone. The well was being drilled using coiled tubing with GelChem drilling mud with a density of 1050 kg/m$^3$ and a plastic viscosity of 55-65 cp. Initially, LC pills of calcium carbonate or sawdust were pumped with no effect. The treatment was performed in five stages:

1. Five bags (~113.5 kg) of water-dispersible 10-14 mm long, 20 micron diameter glass fibers were added to 12 m$^3$ of the mud and pumped through the tubing.
2. Six bags (~136.2 kg) of fibers were added to 12 m$^3$ of the mud and pumped through the tubing.
3. Seven bags (~158.9 kg) of fibers were mixed with the mud and pumped through the annulus (reverse circulation).
4. Twelve bags (~272.4 kg) of fibers were mixed with the mud and pumped through the annulus (reverse circulation), after which returns to the surface in the tubing were observed.
5. Eight bags (~181.6 kg) of fibers were mixed with the mud and pumped through the annulus (reverse circulation) resulting in full circulation being observed.

In total 863 kg of fibers were pumped in 70 m$^3$ of mud.

FIG. 1 shows a system in which fibers can be used in conjunction with a foamed, low-density cement slurry to address lost circulation problems. Suitable low-density cements are described in WO 01/09056 (U.S. Ser. No. 10/049, 198, incorporated herein by reference). The manner in which such slurries can be foamed in described in WO 00/50357 (U.S. Ser. No. 09/914,331, incorporated herein by reference). Low-density cement slurries containing fibers are described in WO 03/014040 (incorporated herein by reference).

In the system shown in FIG. 1, a base cement blend is prepared in a bulk truck 10. For batch mixed applications, this blend is pumped via a pumping truck 12 to a batch mixer 14 at which point fibers are also added. The batch-mixed slurry is then pumped from the mixer 14, via another pump truck 16. For continuous mixing, the first pumping unit 12 and batch mixer 14 are not required and the fibers (and any other additives) are added directly at the pumping unit 16. The output of the mixing unit 16 is directed to a foam generator 22 via a check valve 20 with a foam stabilizer source 18 and nitrogen source 24 connected thereto. The foamed slurry is pumped from the generator 22 to the wellhead 26 and down the well in the normal manner. A bypass line 28 and chokes to pits 30 are included as usual.

It will be appreciated that there are numerous variations that can be made while remaining within the scope of the invention. For example, the fibers can be combined with other LCM's and used in various types of muds. The LCM's can be in the form of gelling systems such as cement-containing systems (e.g. calcium carbonate and micro-cement, or the foamed slurry described above). The fibers can be pumped as a single pill, as a series of pills, or substantially continuously until circulation is restored. The fibers can be pumped through drill pipe, drill bits or other downhole equipment, or through coiled tubing, via the annulus.

The invention claimed is:

1. A method of treating a well comprising pumping a fluid including an aqueous base, solid particles selected from the list consisting of barite, hematite, ilmenite, calcium carbonate, iron carbonate, galena, manganese tetraoxide, dolomite, zinc oxide, cement and mixtures thereof having an average particle size between about 20 μm and 200 μm, and water-dispersable fibers selected from the list consisting of alkali resistant fiber chopped strands or novoloid fibers having a length between about 10 mm and about 25 mm, at a concentration between above 0.5 and 6 pounds per barrel of fluid, wherein the fluid is pumped as drilling fluid and the water-dispersable fibers form on contact of the wellbore a web that enhances the formation of a filter cake, hence reducing loss of fluid into the formation.

2. The method of claim 1, wherein the fibers have a diameter of about 20 μm.

3. The method of claim 2, wherein said solid particles have an average particle size between about 20 μm and 75 μm.

4. The method as in claim 1, wherein the fluid further comprises an additional lost circulation material.

5. The method of claim 4, wherein said lost circulation materials are selected from the group consisting of fibrous materials, flakes and granular sized particles.

* * * * *